United States Patent
Chen et al.

(10) Patent No.: US 11,881,998 B2
(45) Date of Patent: Jan. 23, 2024

(54) SYSTEM FOR NETWORK-BASED REALLOCATION OF FUNCTIONS

(71) Applicant: Avago Technologies International Sales Pte. Limited, Singapore (SG)

(72) Inventors: Xuemin Chen, Rancho Santa Fe, CA (US); Philippe Klein, Jerusalem (IL); Nicholas Ilyadis, Merrimack, NH (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 88 days.

(21) Appl. No.: 17/157,971

(22) Filed: Jan. 25, 2021

(65) Prior Publication Data

US 2021/0152429 A1    May 20, 2021

Related U.S. Application Data

(62) Division of application No. 14/753,559, filed on Jun. 29, 2015, now Pat. No. 10,904,091.

(60) Provisional application No. 62/184,535, filed on Jun. 25, 2015, provisional application No. 62/170,277, filed on Jun. 3, 2015.

(51) Int. Cl.
| | |
|---|---|
| *H04L 41/0896* | (2022.01) |
| *H04N 19/40* | (2014.01) |
| *H04L 43/08* | (2022.01) |
| *H04L 43/087* | (2022.01) |
| *H04L 43/0894* | (2022.01) |
| *H04L 41/5054* | (2022.01) |
| *H04L 67/1001* | (2022.01) |

(52) U.S. Cl.
CPC .......... *H04L 41/0896* (2013.01); *H04L 43/08* (2013.01); *H04N 19/40* (2014.11); *H04L 41/5054* (2013.01); *H04L 43/087* (2013.01); *H04L 43/0894* (2013.01); *H04L 67/1001* (2022.05)

(58) Field of Classification Search
CPC . H04L 41/0896; H04L 43/08; H04L 67/1001; H04L 41/5054; H04L 43/087; H04L 43/0894; H04N 19/40
USPC ........................................................ 709/219
See application file for complete search history.

(56) References Cited

U.S. PATENT DOCUMENTS

| 7,860,100 | B2 | 12/2010 | Khalid | |
|---|---|---|---|---|
| 9,237,188 | B1 * | 1/2016 | Gabrielson | ...... H04N 21/25435 |
| 9,325,621 | B1 | 4/2016 | Ramamurthy | |
| 9,363,183 | B2 | 6/2016 | Kumar | |

(Continued)

*Primary Examiner* — Nicholas R Taylor
*Assistant Examiner* — Chong G Kim
(74) *Attorney, Agent, or Firm* — Foley & Lardner LLP

(57) ABSTRACT

A network may include multiple allocations. The allocations may include: a first allocation encompassing central infrastructure, such as central office servers, data centers, or other core infrastructure; an second allocation encompassing gateway elements or other central consumer premises network infrastructure; and a third allocation encompassing nodes, such as client devices, terminals, or other nodes. A virtualization management engine may coordinate resources from the various allocations to support virtual functions distributed over multiple allocations of the network. The virtualization management engine may determine the distribution across the allocations for the virtual functions. The virtualization management engine may be implemented as a virtual function and be distributed across the allocations of the network.

17 Claims, 18 Drawing Sheets

(56) References Cited

U.S. PATENT DOCUMENTS

| | | |
|---|---|---|
| 9,413,655 B2 | 8/2016 | Shatzkamer |
| 9,485,192 B2 | 11/2016 | Antich |
| 9,614,739 B2 | 4/2017 | Kumar |
| 9,628,380 B2 | 4/2017 | Xia |
| 2002/0136298 A1* | 9/2002 | Anantharamu ...... H04N 19/156 375/E7.198 |
| 2009/0125625 A1 | 5/2009 | Shim |
| 2010/0017516 A1 | 1/2010 | Sparrell |
| 2010/0311425 A1* | 12/2010 | Kampmann ........ H04W 88/181 455/445 |
| 2011/0013709 A1* | 1/2011 | Lu .................... H04L 65/765 375/260 |
| 2011/0164115 A1 | 7/2011 | Bennett |
| 2012/0102154 A1 | 4/2012 | Huang |
| 2012/0147958 A1 | 6/2012 | Ronca |
| 2012/0191876 A1 | 7/2012 | Johnson |
| 2013/0259138 A1 | 10/2013 | Ghat |
| 2014/0047084 A1 | 2/2014 | Bretemitz |
| 2014/0047095 A1 | 2/2014 | Bretemitz |
| 2014/0047227 A1 | 2/2014 | Bretemitz |
| 2014/0047272 A1 | 2/2014 | Bretemitz |
| 2014/0047341 A1 | 2/2014 | Bretemitz |
| 2014/0282777 A1* | 9/2014 | Gonder .............. H04N 21/2225 725/116 |
| 2014/0304399 A1 | 10/2014 | Chaudhary |
| 2014/0355625 A1 | 12/2014 | Chen |
| 2014/0359155 A1* | 12/2014 | Wan .................... H04N 21/222 709/231 |
| 2014/0376623 A1* | 12/2014 | Good ............... H04N 21/23439 375/240.07 |
| 2015/0012615 A1 | 1/2015 | Li |
| 2015/0089082 A1 | 3/2015 | Patwardhan |
| 2015/0189018 A1 | 7/2015 | Cassidy |
| 2015/0200867 A1 | 7/2015 | Dutta |
| 2016/0057209 A1* | 2/2016 | Parikh ................. H04L 69/321 709/203 |
| 2016/0088045 A1 | 3/2016 | Sharma |
| 2016/0134881 A1 | 5/2016 | Wang |
| 2016/0248834 A1 | 8/2016 | Richards |
| 2016/0249079 A1 | 8/2016 | Malone |
| 2016/0323377 A1 | 11/2016 | Einkauf |
| 2016/0344778 A1 | 11/2016 | Cao |
| 2017/0041201 A1 | 2/2017 | Ilyadis |

* cited by examiner

US 11,881,998 B2

SYSTEM FOR NETWORK-BASED REALLOCATION OF FUNCTIONS

PRIORITY CLAIM

This application is a divisional of patent application Ser. No. 14/753,559, filed Jun. 29, 2015, which claims priority to provisional application Ser. No. 62/184,535, filed Jun. 25, 2015 and to provisional application Ser. No. 62/170,277, filed Jun. 3, 2015, each of which is entirely incorporated by reference.

TECHNICAL FIELD

This disclosure relates to network function virtualization.

BACKGROUND

The processing power, memory capacity, available disk space, and other resources available to processing systems have increased exponentially. Computing resources have evolved to the point where a single physical server may host many instances of virtual machines and virtualized functions. Each virtual machine typically provides virtualized processors, memory, storage, network connectivity, and other resources. At the same time, high speed data networks have emerged and matured, and now form part of the backbone of what has become indispensable worldwide data connectivity, including connectivity to virtual machine hosts. Improvements in virtualization will drive the further development and deployment of virtualization functionality.

DETAILED DESCRIPTION

Introduction

Figure 1:
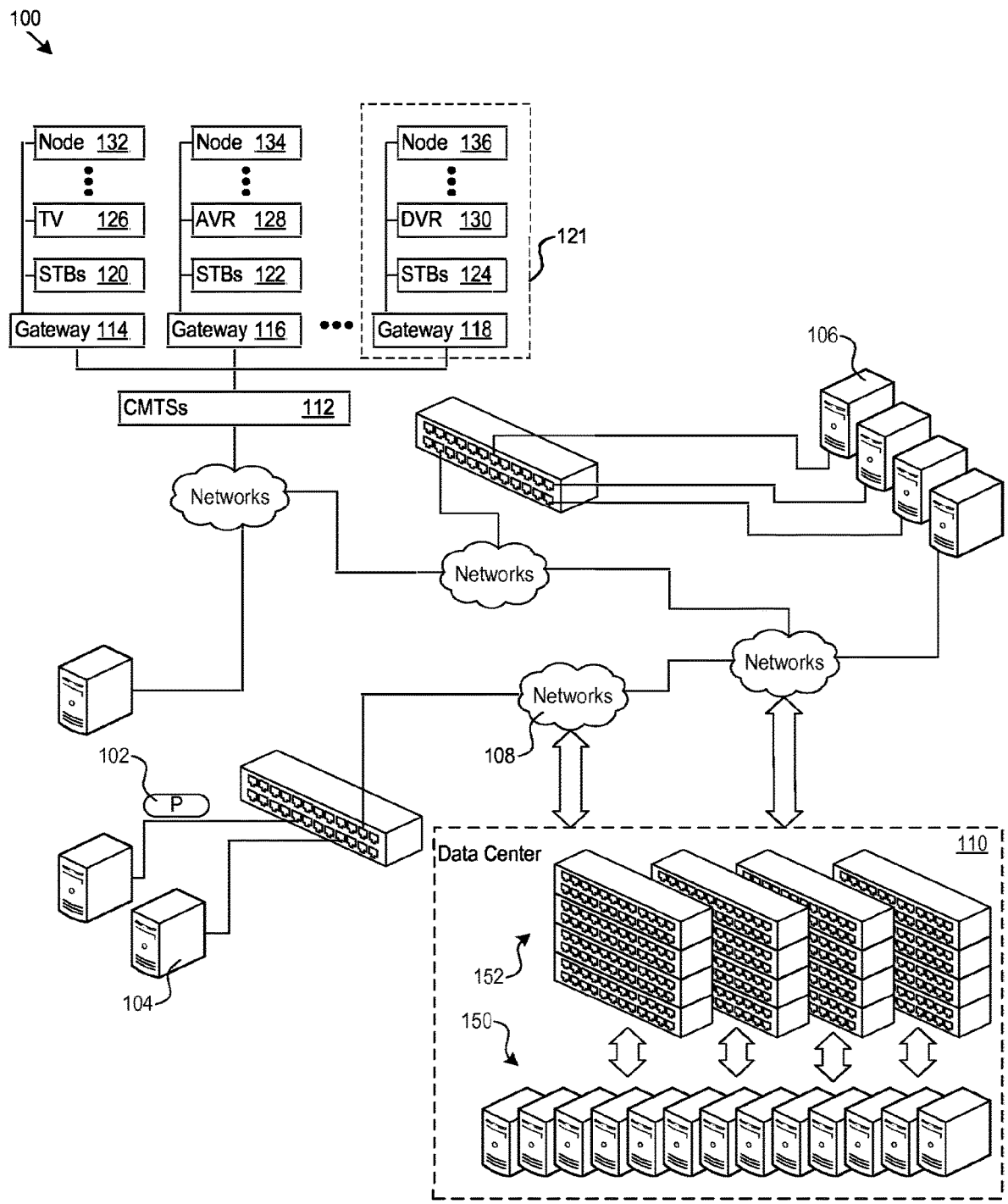
FIG. 1 shows an example of a network that includes virtual machine hosts connected by network devices.
Figure 2:
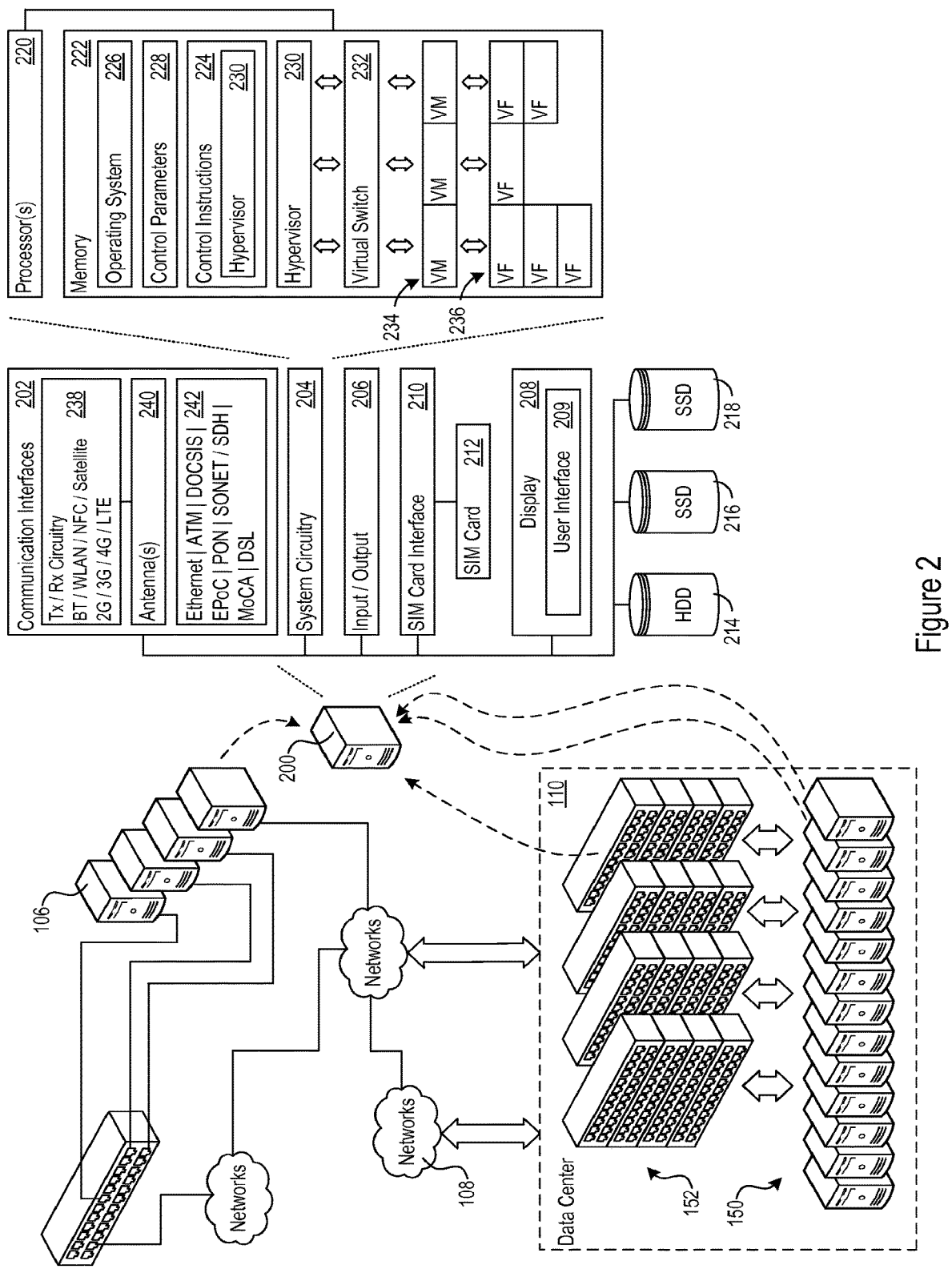
FIG. 2 shows a virtual machine host configured to execute virtual machines and virtual functions.

FIGS. 1 and 2 provide a contextual example and technology background for the further discussion of the network based function reallocation described below in more detail starting with FIG. 3. FIG. 1 shows an example network 100. In the network 100, networking devices route packets (e.g., the packet 102) from sources (e.g., the source 104) to destinations (e.g., the destination 106) across any number and type of networks (e.g., the Ethernet/TCP/IP network 108). The networking devices may take many different forms and may be present in any number. The network 108 may span multiple routers and switches, for instance. Examples of network devices include switches, bridges, routers, and hubs; however other types of networking devices may also be present throughout the network 100.

The network 100 is not limited to any particular implementation or geographic scope. As just a few examples, the network 100 may represent a private company-wide intranet; a wide-area distribution network for cable or satellite television, Internet access, and audio and video streaming; or a global network (e.g., the Internet) of smaller interconnected networks. In that respect, the data center 110 may represent a highly concentrated server installation 150 with attendant network switch and router connectivity 152. The data center or central office server 110 may support extremely high volume e-commerce, search engines, cloud storage and cloud services, streaming video or audio services, or any other types of functionality.

In the example in FIG. 1, the network 100 includes operators and providers of cable or satellite television services, telephony services, and Internet services. In that regard, for instance, FIG. 1 shows that the network 100 may include any number of cable modem termination system (CMTSs) 112. The CMTSs 112 may provide service to any number of gateways, e.g., the gateways 114, 116, 118. The gateways may represent cable modems, combined cable modems and wireless routers, or other types of entry point systems into any of a wide variety of locations 121, such as homes, offices, schools, and government buildings. The network may include virtually any wide area network (WAN) technology. For example, the network 100 may include other types of termination systems and gateways. For example, the network 100 may include digital subscriber line (DSL) termination systems and DSL modems that function as the entry points into homes, offices, or other locations. In another example, an optical network may be implemented.

At any given location, the gateway may connect to any number of any type of node. In the example of FIG. 1, the nodes include set top boxes (STBs), e.g., the STBs 120, 122, 124. Other examples of nodes include network connected smart TVs 126, audio/video receivers (AVRs) 128, digital video recorders (DVRs) 130, streaming media players 132, gaming systems 134, computer systems 136, physical media (e.g., BluRay) players, wearable devices, building automation devices, home appliances, sensors, and security systems. The nodes may represent any type of customer premises equipment (CPE).

FIG. 2 shows a virtual machine host 200 ("host") configured to execute virtual switches, virtual machines, and virtual functions. Any of the devices in the network 100 may be hosts, including the nodes, gateways, CMTSs, switches, servers, sources, and destinations. The hosts provide an environment in which any selected functionality may run, may be reachable through the network 100, and may form all or part of a chain of functionality to accomplish any defined processing or content delivery task. For example, a gateway, server, or both may cooperate with a node, e.g., a wearable device, to complete a task outside the onboard functionality of node alone. The functionality may be virtual in the sense that, for example, the virtual functions implement, as software instances running on the hosts, functions that were in the past executed with dedicated hardware.

In FIG. 2, the host 200 includes one or more communication interfaces 202, system circuitry 204, input/output interfaces 206, and a display 208 on which the host 200 generates a user interface 209. The communication interfaces 202 may include transmitter and receivers ("transceivers") 238 and any antennas 240 used by the transceivers 238. The transceivers 238 may provide physical layer interfaces for any of a wide range of communication protocols 242, such as any type of Ethernet, data over cable service interface specification (DOCSIS), digital subscriber line (DSL), multimedia over coax alliance (MoCA), or other protocol. When the communication interfaces 202 support cellular connectivity, the host 200 may also include a SIM card interface 210 and SIM card 212. The host 200 also includes storage devices, such as hard disk drives 214 (HDDs) and solid state disk drives 216, 218 (SDDs).

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces.

The system circuitry 204 may include any combination of hardware, software, firmware, or other logic. The system circuitry 204 may be implemented, for example, with one or more systems on a chip (SoC), application specific integrated circuits (ASIC), discrete analog and digital circuits, and other circuitry. The system circuitry 204 is part of the implementation of any desired functionality in the host 200. In that regard, the system circuitry 204 may include circuitry that facilitates, as just a few examples, running virtual machines, switches, and functions, routing packets between the virtual machines and the network 100, and switching packets between the virtual machines.

As just one example, the system circuitry 204 may include one or more processors 220 and memories 222. The memory 222 and storage devices 214, 216 store, for example, control instructions 224 and an operating system 226. The processor 220 executes the control instructions 224 and the operating system 226 to carry out any desired functionality for the host 200. The control parameters 228 provide and specify configuration and operating options for the control instructions 224, operating system 226, and other functionality of the host 200.

In some implementations, the control instructions 224 include a hypervisor 230. The hypervisor 230 provides a supervising software environment that executes one or more virtual machines (VMs), virtual switches 232, virtual firewalls, virtual operating systems, virtual network interface cards (NICs), or any other desired virtualization components. In other implementations, the host 200 is a bare-metal virtualization host. That is, the host 200 need not execute a separate operating system 226 on top of which the hypervisor 230 runs. Instead, the hypervisor 230 may directly communicate with and control the physical hardware resources in the host 200 without supervision or intervention through a separate operating system.

The host 200 may execute any number of VMs 234. Each VM may execute any number or type of virtual functions (VFs) 236. The VFs may be software implementations of any desired functionality, ranging, for instance, from highly specialized network functions to general purpose processing functions.

As just a few examples of service functions, the VFs 236 may implement network firewalls, messaging spam filters, and network address translators. As other example of processing functions, the VFs 236 may implement audio and video encoders and transcoders, voice/facial/gesture recognition, digital rights management (DRM) processing, database lookups, e-commerce transaction processing (e.g., billing and payment), web-hosting, content management, context driven advertising, and security processing such as High-bandwidth Digital Content Protection (HDCP) and Digital Transmission Content Protection (DTCP-IP) processing. Additional examples of VFs 236 include audio, video, and image compression and decompression, such as H.264, MPG, and MP4 compression and decompression; audio and video pre- and post-processing; server functionality such as video on demand servers, DVR servers; over the top (OTT) servers; secure key storage, generation, and application; and 2D and 3D graphics rendering.

Reallocation of Functions

Figure 3:
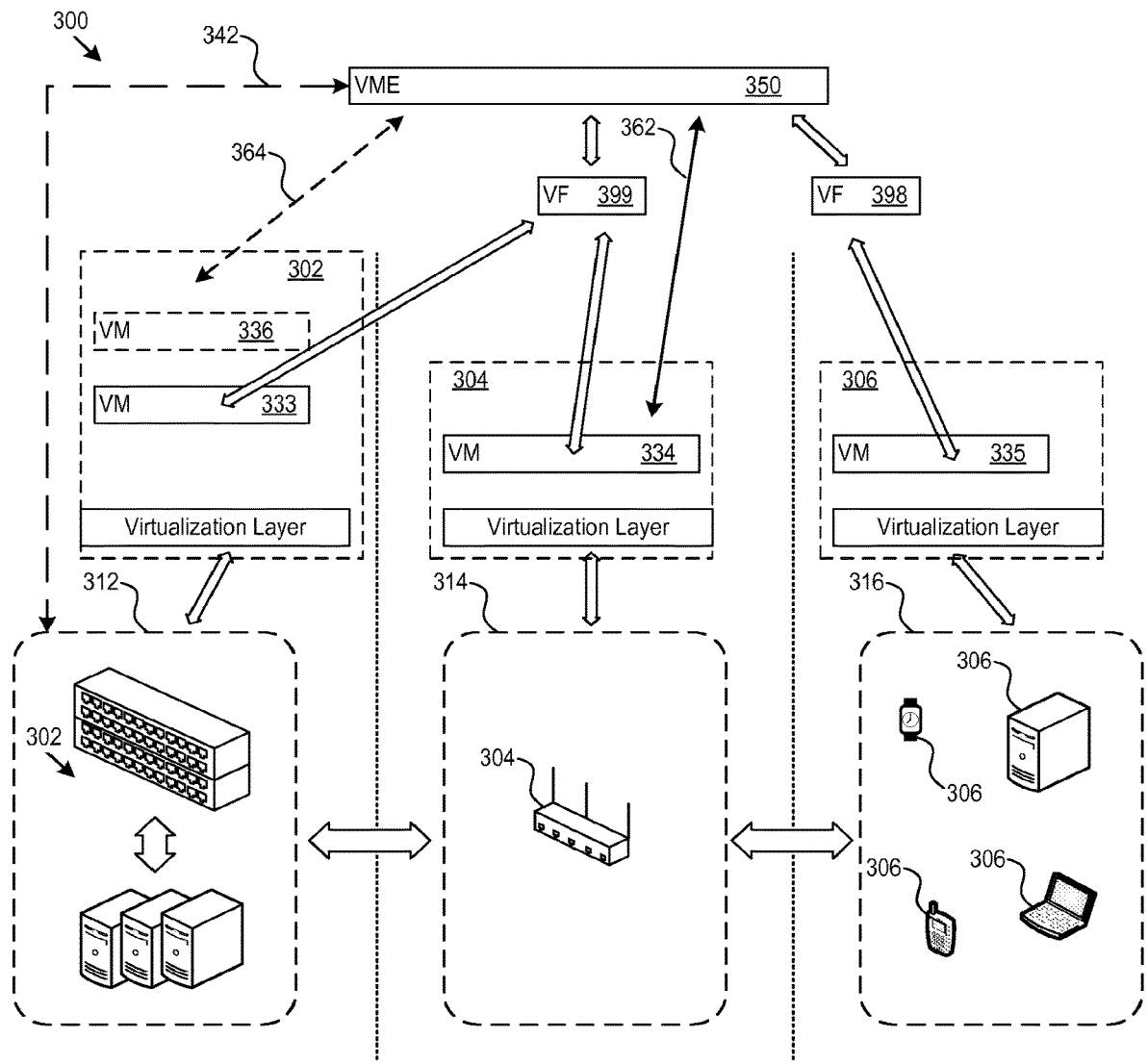
FIG. 3 shows an example environment for function reallocation.

Turning to FIG. 3, an example environment 300 for function reallocation is shown. A provider data system (PDS) 302, e.g., a central office server (COS), data center, or other system may be coupled to a gateway 304, e.g. a residential gateway (RGW), which may in turn be coupled to a node 306, e.g., a set-top-box. Reallocation of functions may occur among allocations of devices. FIG. 3 shows an example in which the devices are organized into allocations 312, 314, 316 of the network. In this example, the allocations include allocation 1 312 An allocation may correspond to devices at a specific location, having a specific role, having specific processing capability, owned or controlled by a specific entity, other specific factors, or a combination of specific factors, which encompasses the PDS 302 and allocation 2, which encompasses the gateway 304 (allocation 2 314) and which may be located, e.g., at the consumer premises. In various implementations, the gateway 304 and PDS 302 may be coupled over a WAN. Then, allocation 3 316 may include nodes, client devices, or other communication devices, located at the customer premises or elsewhere and served by the gateway 304. Gateways may include modems (e.g., cable, digital subscriber line (DSL), fiber, or other modems), routers (e.g., wireless, wired, or other routers), network media devices (e.g., personal media recorders, network storage devices, or other network media devices), or other processing devices.

The gateway 304 may be coupled to the nodes 306 via a local area network (LAN), such as a wireless LAN (e.g., Wi-Fi) or ethernet network, or other LAN. Functions may be moved and distributed among any of the allocations 312-316, including among devices such as the PDS 302 and the gateway 304, among the gateway 304 and the nodes 306, among the PDS 302 and the nodes 306 in any combination. To support this reallocation, virtualization of functions may occur within the devices at each allocation and across the allocations 312-316.

The virtualized functions may run on VMs running at various ones of the allocations 312-316. FIG. 3 shows an example in which four VMs, the VMs 333, 334, 335, 336, are defined, and which may be provisioned on any of the hardware resources at any of the allocations 312, 314, 316. Any number of VMs may be implemented. Further VMs dynamically added, torn down, updated, reconfigured, provisioned onto any available hardware resources at any node in any of the allocations 312-316.

Thus, a VFs 399, 398 may be provisioned to execute within any allocation or reallocated from one allocation to another by re-provisioning the VF 236 to execute on any selected VM 333, 334, 335, 336. The provisioning may be done to accomplish any desired balance of resources among the allocations. A hypervisor or other VM platform infrastructure may be used to implement a virtualization layer in support of any of the VMs 333, 334, 335, 336 and the hardware resources of the allocations 312-316. Further, the VFs 236 may be assigned to the VMs 333, 334, 335, 336 via virtualization management engine (VME) 350. The VME 350 may also be run on one or more VMs as a VF, and thus, may also be distributed across the allocations 312, 314, 316 of the network. For example, the VME 350 may be implemented 362 hardware resources allocated to multiple VMs running on multiple allocations 312-316. However, in some cases the VME 350 may be implemented 364 on one or more VMs, such as VM 336, with resources allocated from a single allocation (e.g., allocation 312). Additionally or alternatively, the VME 350, or a portion of the VME 350, may bypass 342 the virtualization layer 340 and run as an non-virtual application on the hardware of an allocation, e.g., allocation 312. In some cases, The VME 350 may implement machine learning algorithms to execute various ones of the VF reallocation or redistribution features described herein. Additionally or alternatively, the VME 350 may use non-machine-learning routines to implement various ones of the VF reallocation or redistribution features described herein.

The VME 350 may dynamically allocate or manage resources including network communication, storage and processing functions. For example, the coordinated resources may be used to support added processing capabilities at selected nodes, e.g. increased video compression efficiency, or other processing efficiency. The VME 350 may coordinate VFs 399, 398. For example, the VFs may have access to disparate resources (e.g., processing hardware, video coding devices, network bandwidth, applications, or other resources) that may be used in conjunction to perform a specified task. For example, a task may include parsing an auditory search query. The VME 350 may assign initial a first VF working near the network edge (e.g., allocations 2 or 3 314, 316). The VME 350 may assign a second VF near the network core the task of refining the parsing to the first VF. The VME 350 may instruct the first VF to send the initial processing results to along with the audio to avoid redundant processing. Hence, the two VFs may work in concert.

Additionally or alternatively, the VME 350 may coordinate when a particular VF among multiple capable VFs performs a task. For example, a voice recognition task may be assigned to multiple VFs for (e.g., one for coarse analysis and one for fine analysis) at times of low (e.g., below a specified threshold) network latency. While at times of high latency (e.g., above a specified threshold) the voice recognition task may be assigned to a single VF or fewer VFs to reduce latency effects on the output where the multiple VFs are instantiated at multiple nodes on the network.

Through VF (e.g., 399, 398) coordination, the VME 350 may effectively coordinate multiple processing modules, e.g., video processing modules, to achieve processing efficiency gains. For example, the VME 350 may transfer a 3D rendering task from a graphics processor on a smartphone (or other node 306) to a higher efficiency graphics processor in a PDS 302. Other examples of task reallocation are discussed below.

In some implementations, the VME 350 may be used to provide adaptive network bandwidth utilization (e.g. reduced congestion from network services) by implementing coordinated quality of service (QoS) enforcement at any or all of the network allocations.

The VME 350 may facilitate a reduction in the memory bandwidth utilization at selected element in the network. For example, the VME 350 may change the content coding behavior among the different allocations of the network to implement memory-bandwidth shaping.

In some cases, the VME 350 may be used to manage the network power profile. For example, the VME 350 may reduce the power consumption by a selected network system or component using a sub-network power-envelope managed by corresponding VFs.

Additionally or alternatively, the VME 350 may coordinate deployment of security resources to balance protection with redundancy elimination. In some systems, the VME 350 may be used to coordinate network components to reduce latency or strengthen other network performance parameters. The coordination of network resources through the VME 350 may also increase system robustness through consistent network resource allocation and coordination of resource replacement during failure conditions. Specific examples of VF allocation are given below.

Figure 4:
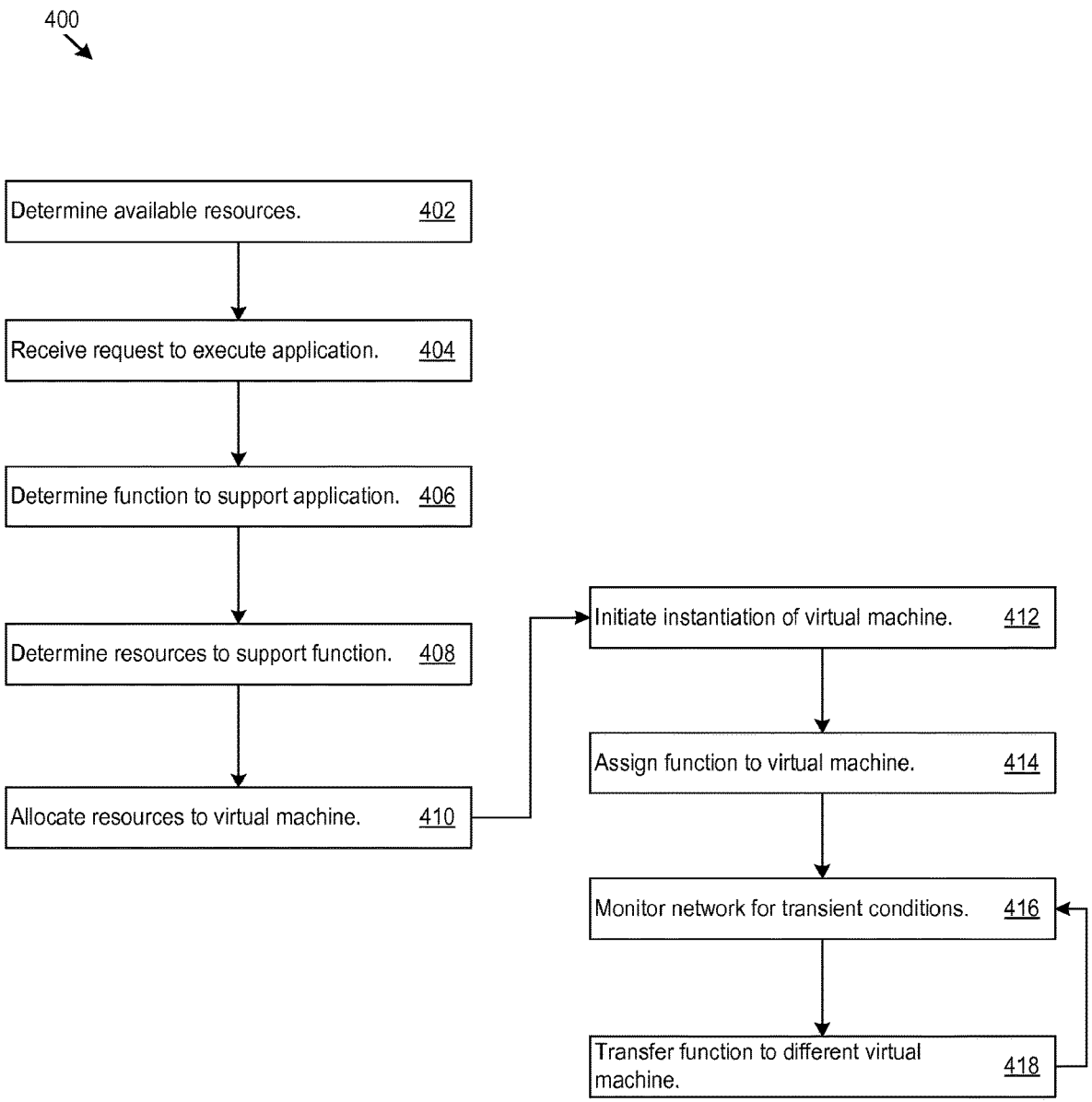
FIG. 4 shows example virtualization management engine (VME).

Looking now to FIG. 4, example VME 400 is shown. The VME 400 may determine resources available at network allocations (402). The VME 400 may receive a request to execute an application from a node (404). The VME 400 may determine a function to support the application (406). The VME 400 may determine resources on which to implement the function (408). For example, the VME 400 may determine what processing resources each allocation has available. The VME may assign determine the distribution based on the available processing resources. However, other factors, such as network performance, power consumption, memory bandwidth, or other parameters, may be included in determination of the resource assignment. The VME 400 allocates the resources to a VM (410). The VME 400 may initiate the instantiation of the VM (412). The VME 400 may assign the function to the VM (414).

Once the VME 400 assigns the function to a VM, the VME 400 may monitor the system for specific conditions (416). For example, the specific conditions may include network conditions (e.g., traffic type, traffic amount, congestion indications, dropped packets, bandwidth availability, latency, or other network conditions) processor loads (e.g., processor utilization thresholds, core temperature threshold, duty ratio threshold, power consumption threshold, or other thresholds), or other specific conditions. When conditions meet any pre-established criteria (e.g., decision thresholds), the VME 400 may transfer a function to another VM characterized by a different distribution of resources (418). Thus, the VME 400 may adapt to specific network conditions.

Additionally or alternatively, the VME 400 may be used to manage processing load at various allocations, e.g., 312-316, of the network. For example, a VF may cause a gateway to reduce the processing load associated with stream decoding a playback node. In the example, the gateway may transcode a stream resulting in a compression scheme requiring less memory bandwidth decode than the stream provided to the gateway from the CSO. By causing the gateway to transcode the stream, the VME effectively passes a portion of the decoding task from the playback node to the gateway. In some cases, this technique may be used to expand capabilities of nodes. For example, a node with a set amount of onboard computing power may be able to display content relying on hardware and capabilities not necessarily present on the node itself. Alternatively or additionally, resources onboard the node may be reserved for other tasks. Freeing up local hardware resources may increase the perceived performance of the node by the operator, which may generate a positive operator experience.

Figure 5:
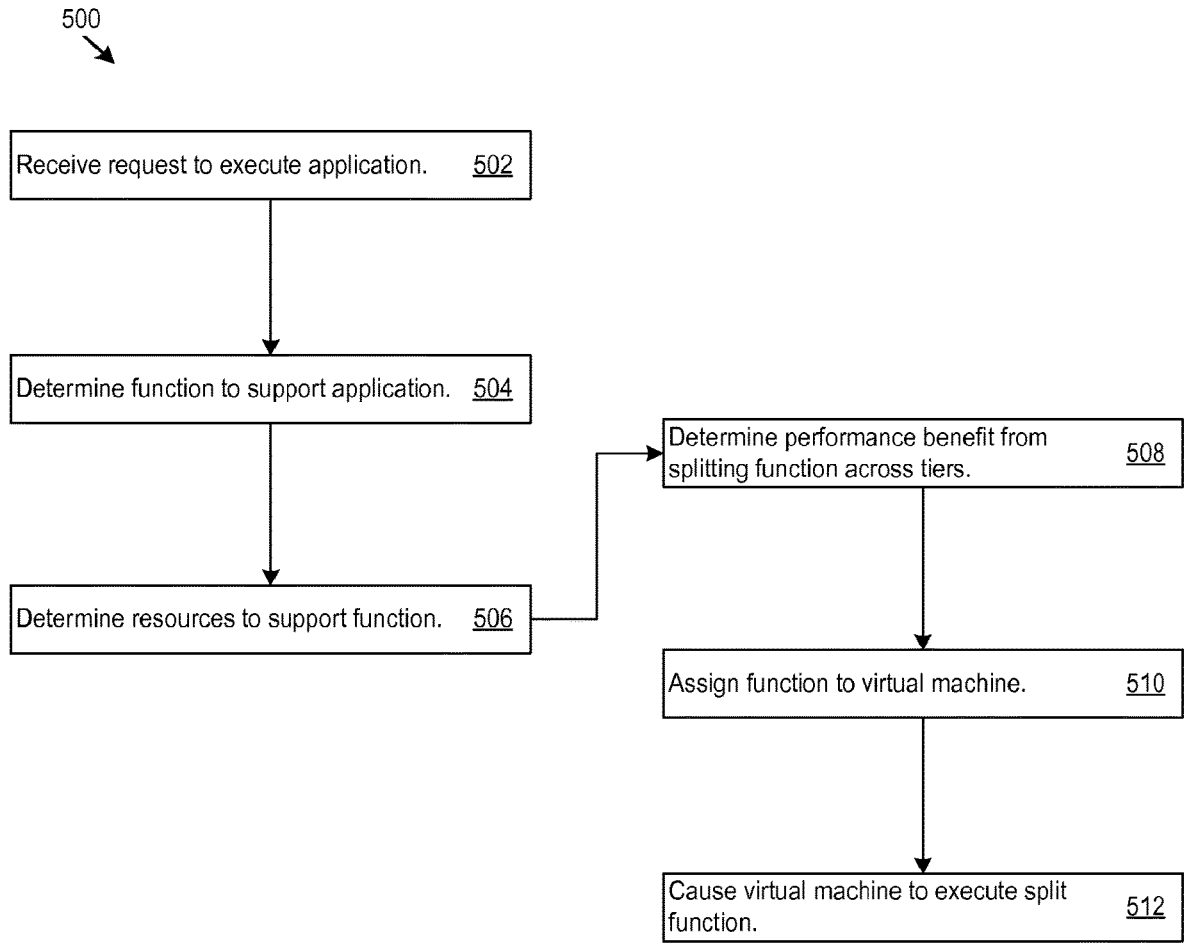
FIG. 5 shows example VME for coordinating the splitting of a function among multiple allocations of the network.

FIG. 5 shows example VME 500 for coordinating the splitting of a function among multiple allocations of the network. The VME 500 may receive a request to execute an application (502). For example, the VME 500 may receive a request to stream content. In another example, the VME may receive a request to perform voice recognition. The VME 500 may determine a function to support the application (504). The VME 500 may determine resources available to support the function (506). The VME 500 may determine a reason (e.g., a performance benefit) for splitting the function among multiple allocations of the network (508). For example, the VME 500 may determine that performing transcoding at a gateway may allow multiple media stream requests to be served by a single stream. In another example, the VME 500 may determine that a lower latency response may be possible by performing an initial processing stage closer to the network edge (e.g., at allocation 2 314 or allocation 3 316) instead of passing the entire processing task to allocation 1 components. The VME 500 may assign the function to a VM or group of VMs distributed across the allocations in accord with the determination to split the function (510). The VME 500 may cause the VM to execute the split function (512).

The VME 500 may be used to coordinate a splitting of a transcoding process among the allocations of the network. For example, this may allow a STB to support more screens than would be possible using the hardware of the STB alone. Other capability adjustments, such as expanded codec support or video processing efficiency upgrades may be delivered to STBs or other nodes without necessarily applying concurrent hardware adjustments to the node. In an example scenario, a content provider may provide the processing support to display or otherwise interact with the content as a network service. In some cases, provision of processing support may be used in place of a physical upgrade to a node.

Figure 6:
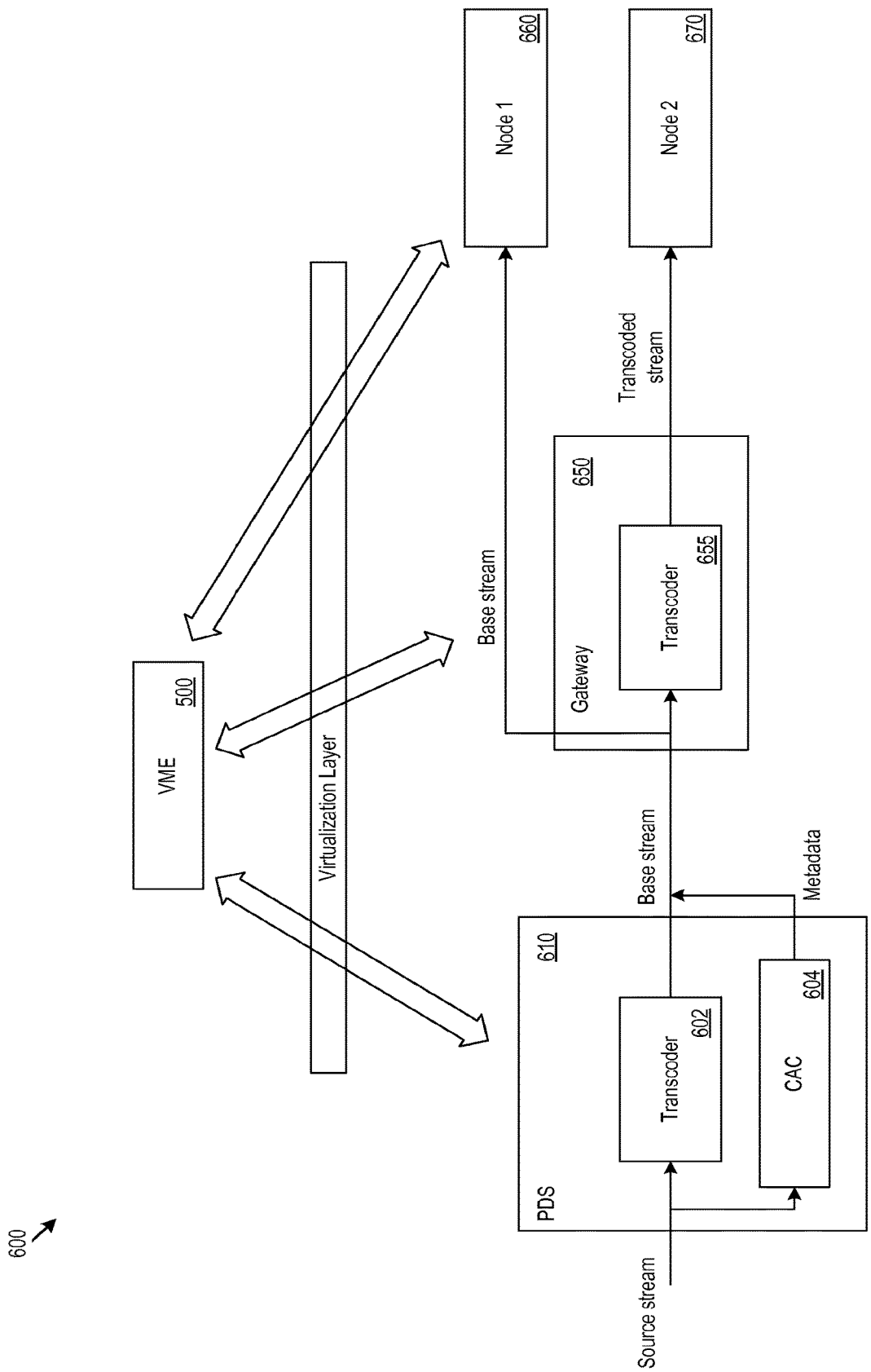
FIG. 6 shows an example video coding splitting scenario.

FIG. 6 shows an example video coding splitting scenario 600. A transcoder 602 at a PDS 610 may encode base stream according to a first codec, e.g., carrier-grade H.264/MPEG-4 stream. Coding assistance circuitry (CAC) 604 may also generate coarse motion-vectors (CMVs) and coding modes for coding units in accord with a second codec, e.g., a H.265 codec. The PDS 610 send these CMVs and coding modes, e.g., as synchronized metadata, along with the base stream to a gateway 650. In some cases, the CMVs and metadata to support the transcoding using the second codec may be scaled to a different resolution from that of the base stream. At the gateway 650, the base stream may be sent to a first node 660 for decoding, while the metadata, e.g., H.265 CMVs and coding modes, may be used for transcoding at the transcoder 655 of the gateway. The gateway 650 may send the transcoded stream to a second node 670. In various cases, the transcoding may be implemented to support multiscreen applications, wireless transfers (e.g., through reduced file sizes), or other applications at the second node. Supporting the transcoding operation at the gateway with metadata from the PDS may reduce the processing load originating from the transcoding operation at the gateway. The VME 500 may coordinate the operations at each part of the network.

In some cases, a PDS may provide one stream that may serve multiple clients of a gateway using multiple codecs. The PDS may send one stream and the gateway may transcode the stream sent from the PDS to generate one or more replacement streams for clients using codecs other than that of the stream sent by the PDS.

Figure 7:
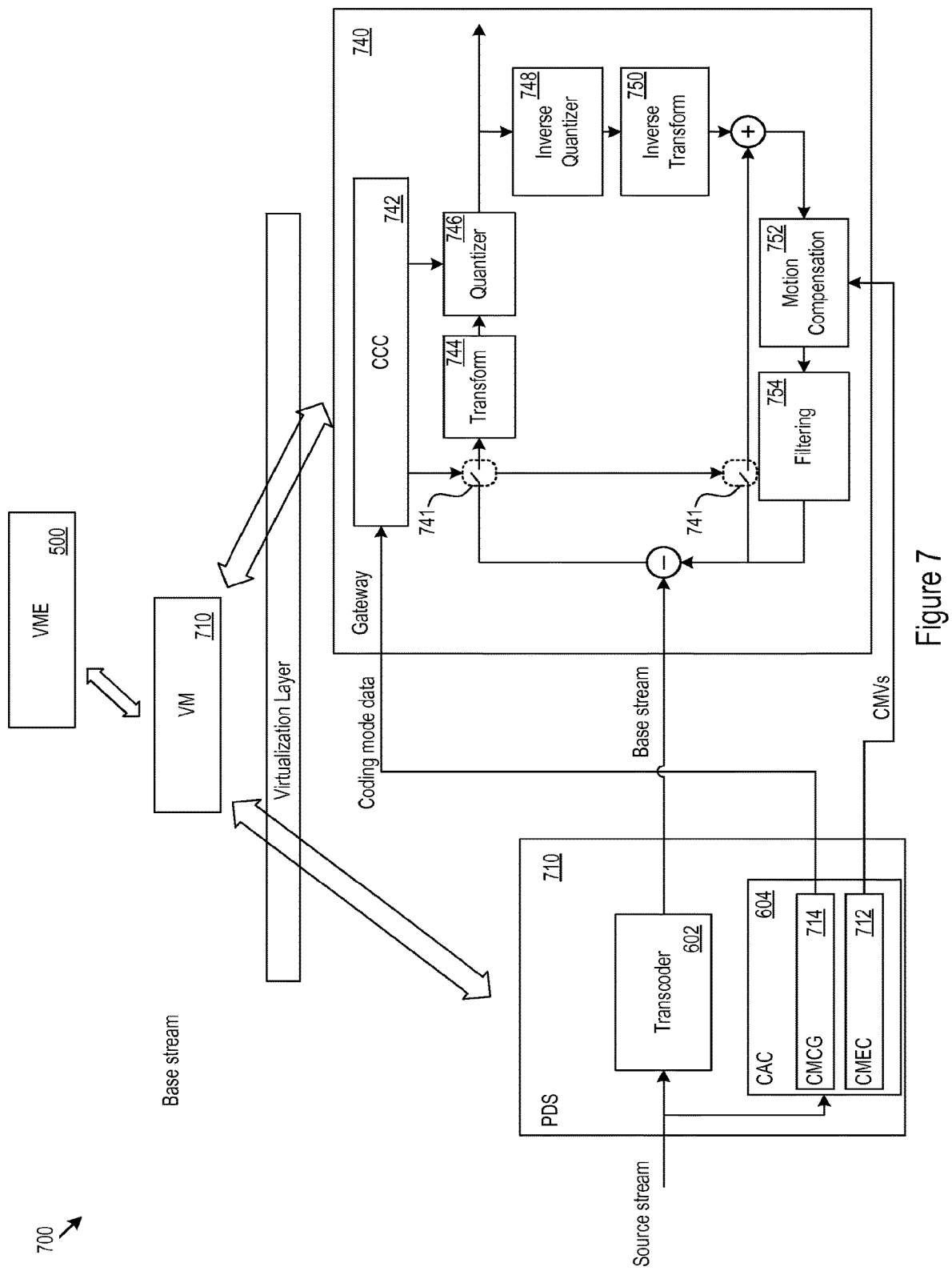
FIG. 7 shows a transcoding platform which may execute a virtualized transcoding operation.

The VME 500 may coordinate the transcoding splitting scheme by assigning the transcoding operation to one or more VMs occupying the hardware used in the transcoding operation and the display operations at the nodes. FIG. 7 shows a transcoding platform 700 which may execute a virtualized transcoding operation. The transcoding platform includes hardware present on a PDS 710 and gateway 740. The PDS may include CAC components 712, 714. The CAC components 712, 714 may include coarse motion estimation circuitry (CMEC) 712 and coding mode generation circuitry (CMGC) 714. The CMCG 714 may send coding mode data to the coding control circuitry (CCC) 742 at the gateway 740. Switches 741 for controlling the coding mode may be operated by the CCC 742. The CMEC 712 may send CMVs to the motion compensation circuitry 752 at the gateway 740. The stream sent from the PDS 710 to the gateway may include the base stream encoded according to a first codec. The base stream may be transcoded using the transform circuitry 744, quantizer circuitry 746, inverse quantizer circuitry 748, inverse quantizer circuitry 750, motion compensation circuitry 752, filtering circuitry 754, and the CCC 742. The transcoded stream may be sent to a node 770 for decoding. The one or more VMs 710 may provide a logical entity by which the hardware of the transcoding platform 700 may be coordinated by the VME 500.

Figure 8:
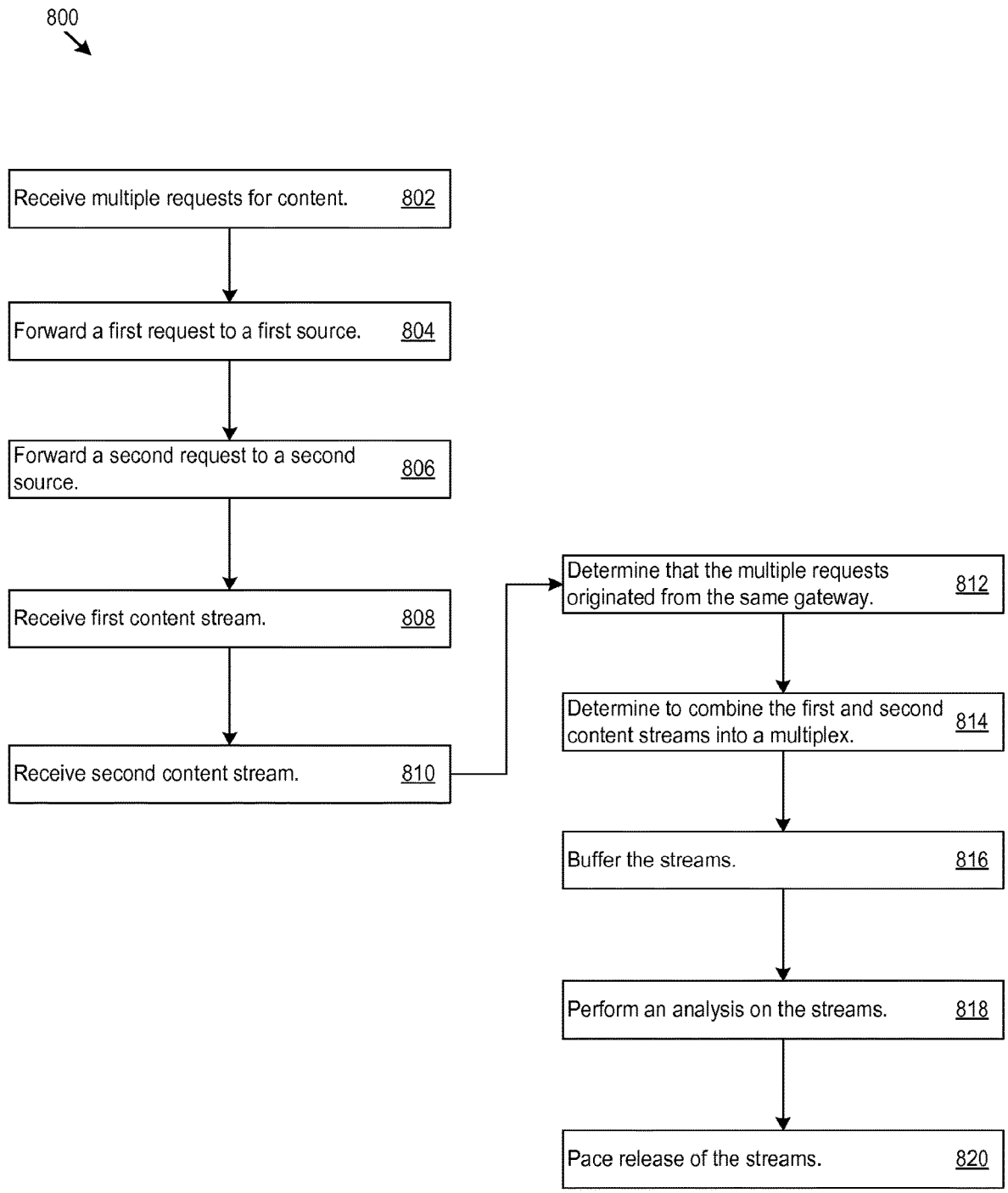
FIG. 8 shows example VME for multiplexing independent streams.

Turning now to FIG. 8, example VME 800 for multiplexing independent streams is shown. The example VME 800 may receive multiple requests for streaming content (802). For example, the VME 800 may receive one content request for streaming video from a first source and second request for streaming video from a second source. The VME 800 may forward a first request of the multiple requests to a first source (804). The VME may forward a second request of the multiple requests to a second source (806). The sources may include third party content sources, a media server at a PDS of the network, or other content sources. The VME 800 may receive a first content stream in response to the first request (808). The VME 800 may receive a second content stream in response to the second request (810). The VME 800 may determine that the multiple requests originated from the same gateway (812). The VME 800 may determine that a multiplexed stream would facilitate reduced bandwidth utilization in comparison to the separate first and second content streams. The VME 800 may determine to combine the first and second content streams into a multiplex (814). The VME 800 may buffer the streams (816). The VME 800 may perform an analysis on the streams (818). Responsive to the analysis, the VME 800 may pace release of the streams to manage bandwidth utilization of the multiplexed stream (820).

The streaming content, e.g., audio or video, that is multiplexed may include multiple streams from multiple providers, e.g., Pandora®, Spotify®, Netflix®, HBO® GO, Hulu®, YouTube®, Amazon® Instant Video, TiVo® IP video, or other streaming content sources. When receiving multiple independent IP streams, a system may setup independent network resource allocations for each of the streams. However, the VME 800 may be used to inspect and coordinate the streams such that resources, e.g., bandwidth reservations, may be shared among the streams rather than independently provided. In some cases, the bandwidth usage of two coordinated streams, e.g. when statistically multiplexed, may be less than that used by the streams if they were provided independently.

To manage bandwidth utilization, one may coordinate the two streaming services by joining the scheduling of the streams at the PDS and at the playback buffers at the nodes displaying the steam. The VFs used to control the streaming services and the scheduling may be controlled via VME 800. For example, a VF may be used to control hardware from the PDS to the playback node for each of the streams being coordinated. In various implementations, VME 800 may manage the network resources, e.g., resources at the CSO and gateway. The VME 800 may also receive streaming service requests (e.g. content type, source/destination, streaming time, QoS requirements, or other parameters) and playback node capabilities from the VFs controlling the streaming services and buffers.

Figure 9:
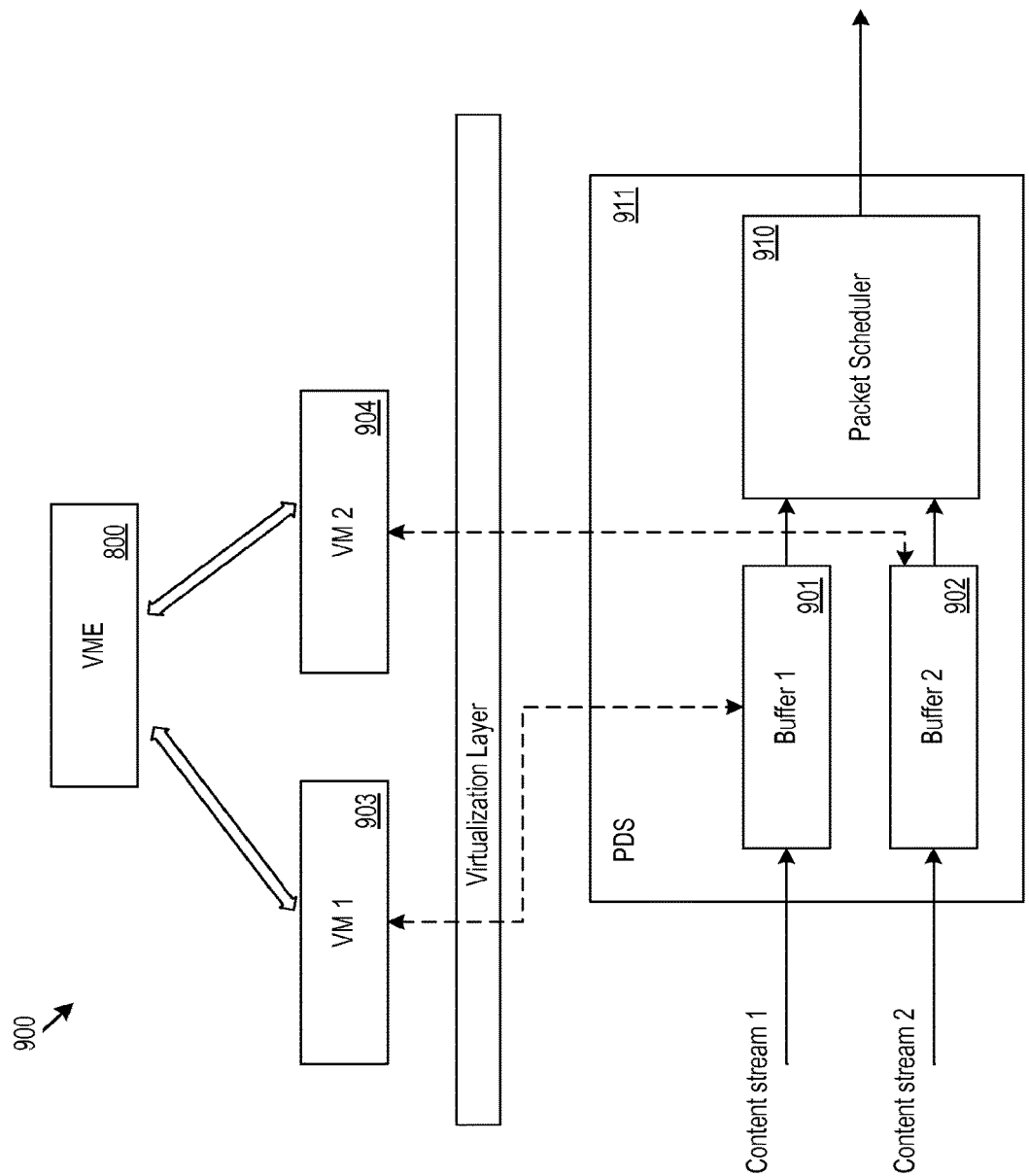
FIG. 9 shows example stream coordination circuitry.

Turning now to FIG. 9, example stream coordination circuitry (SCC) 900 is shown. The buffers 901 and 902 may be controlled by VFs 903, 904 for individual streaming services provided from the PDS 911 to the playback node. By using packet inspection, e.g. deep packet inspection, the packet scheduler 910 may be able to reshape the transmission pattern of the multiplexed output traffic from the buffers 901, 902. For example, video streams may be coordinated by staggering the I-frames between two streams. Because I-frames may create a transient high in the instantaneous bit rate for a stream, staggering the I-frames of multiple streams may allow the streams to occupy a smaller bandwidth reservation than the combined size of individual reservations of the streams. For example, the individual bandwidth allocations of the streams may be made to accommodate the instantaneous bit rate cause by transmission of the I-frames rather than targeting the average bit rate of each stream. The VME 800 may coordinate the buffers 901, 902 and packet scheduler 910 to manage the overall transmission rate. The VME 800 may control release of the packets from the buffers 901, 902 via the packet scheduler 910. The VME 800 may base the decisions on when to release packets: on network performance, the reception of multiple requests for content from a gateway, or the results of a packet inspection, or other parameters. Thus, the VME 800 may reshape traffic to manage bandwidth utilization. For example, the VME 800 may achieve traffic smoothing through statistical multiplexing of streaming content. Although the SCC 900 is controlled via two VMs 903, 904 in the example shown other implementations may be used. For example, one VM may be used to control multiple ones of the buffers.

Figure 10:
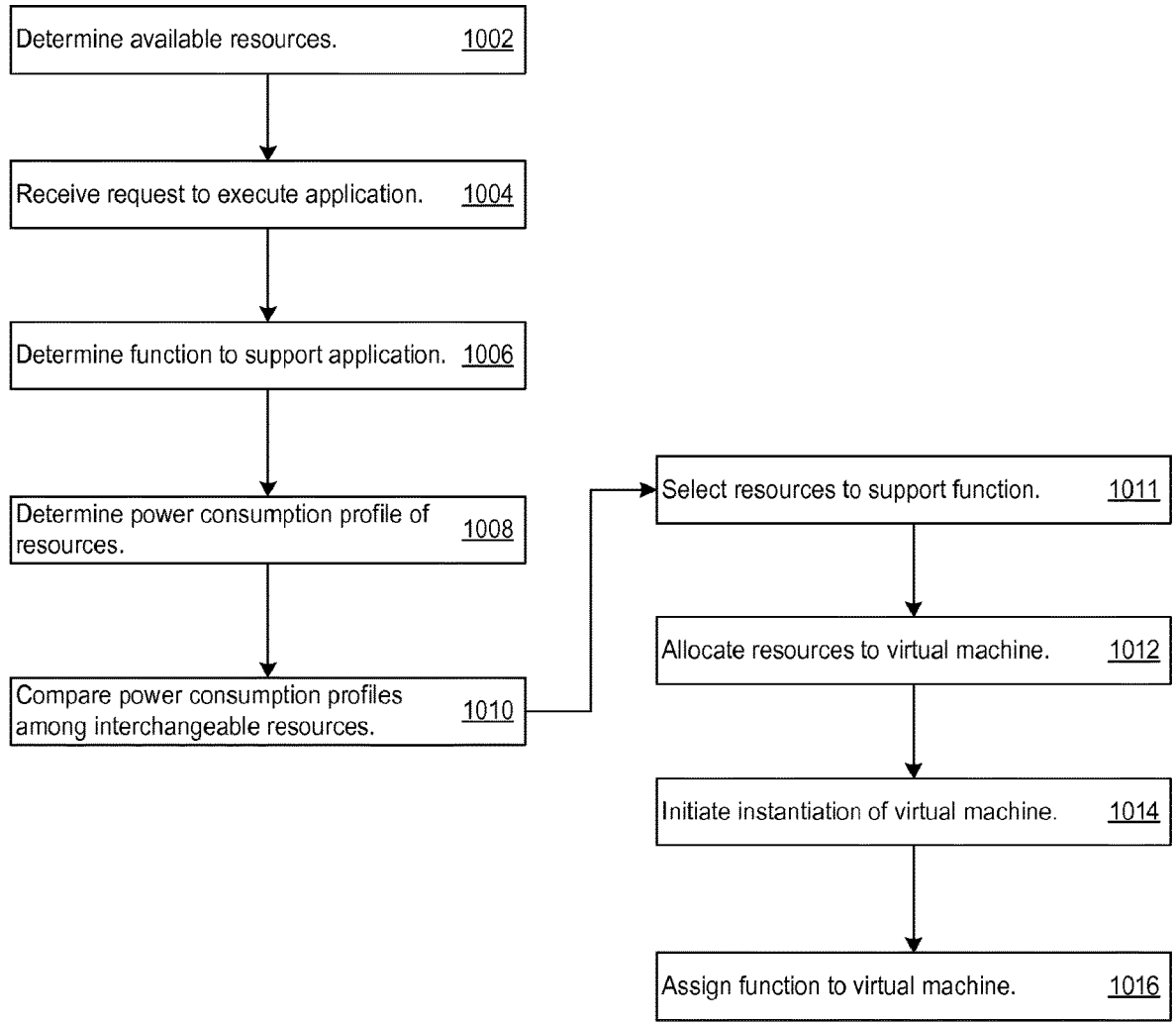
FIG. 10 show example VME for power management.

Moving on to FIG. 10, example VME 1000 for power management is shown. The VME 1000 may determine resources available at network allocations (1002). The VME 1000 may receive a request to execute an application from a node (1004). The VME 1000 may determine a function to support the application (1006). The VME 1000 may determine the power consumption profile of the resources (1008). Where resources may be substituted for other resources at different allocations, the VME 1000 may compare power profiles among the interchangeable resources (1010). Responsive the comparison, the VME 1000 may select resources to support the function (1011). The VME 1000 allocate the resources to a VM (1012). The VME 1000 may initiate the instantiation of the VM (1014). The VME 1000 may assign the function to the VM (1016).

In some cases, the VME 1000 may be used to manage power consumption at the various allocations of the network. For example, 2D/3D graphics rendering may cause battery drain at a mobile device. However, the battery drain experienced display rendered 2D/3D content may be reduced if the VME 1000 assigns the rendering task (or a portion of the task) to a PDS or gateway.

Figure 11:
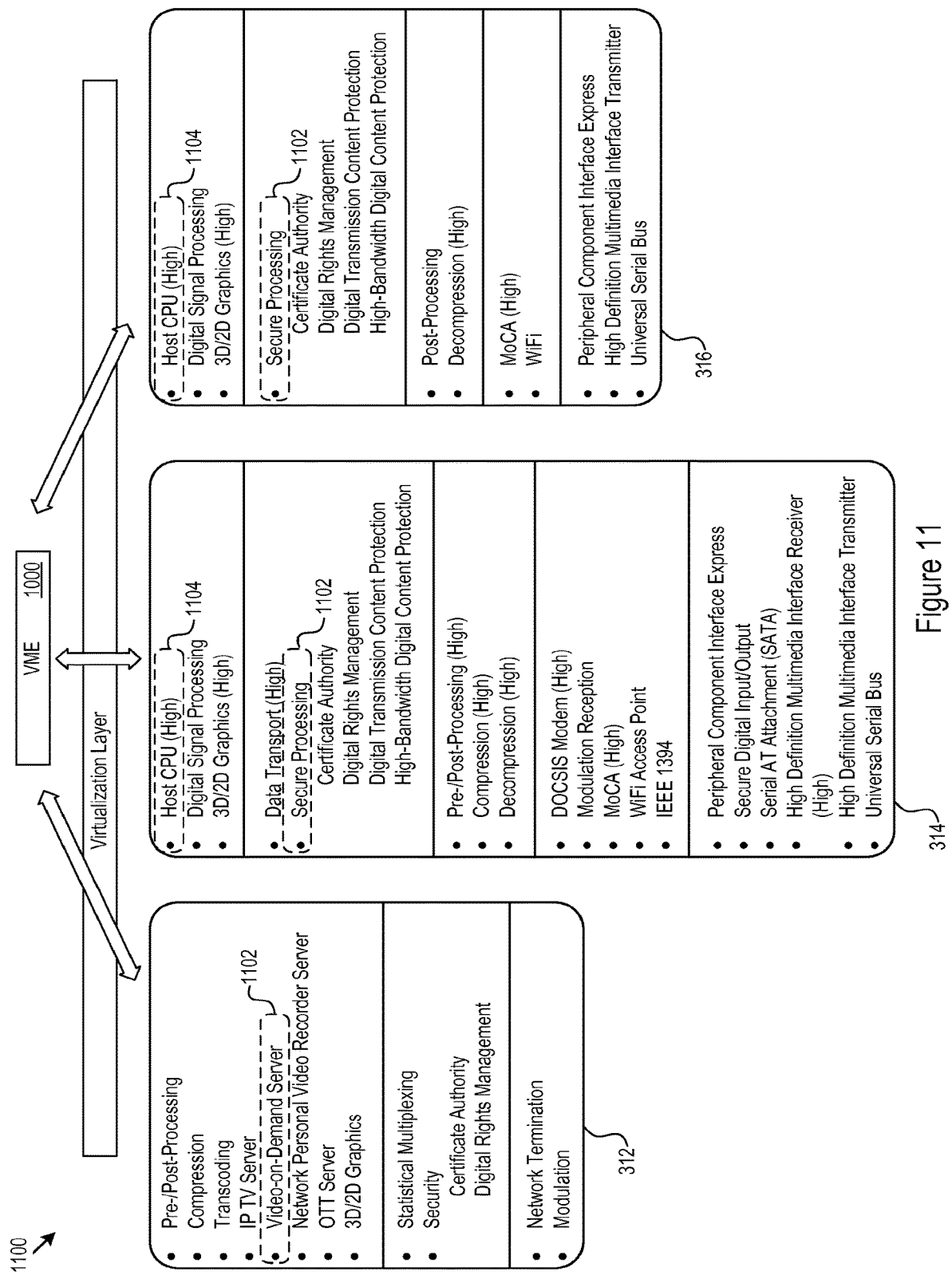
FIG. 11 shows example functions that may affect to power consumption at the various allocations.

FIG. 11 shows example functions 1102, 1104 that may affect power consumption at the various allocations 312, 314, 316 of the network. Some functions drain more power than others. High drain functions 1104 may, e.g., on average, drain more power than other similarly categorized functions. In some cases, functions (or substitutable functions) may have smaller marginal power consumption at different allocations of the network. For example transcoding and 2D/3D rendering may be high drain functions 1104 at allocation 2 and allocation 3, but may not necessarily have as large a marginal effect at allocation 1. Hence, in some cases, a PDS may service such functions at allocation 1. However, in some implementations, the use of function reallocation for power consumption management may also be based on other factors, such as network performance.

Figure 12:
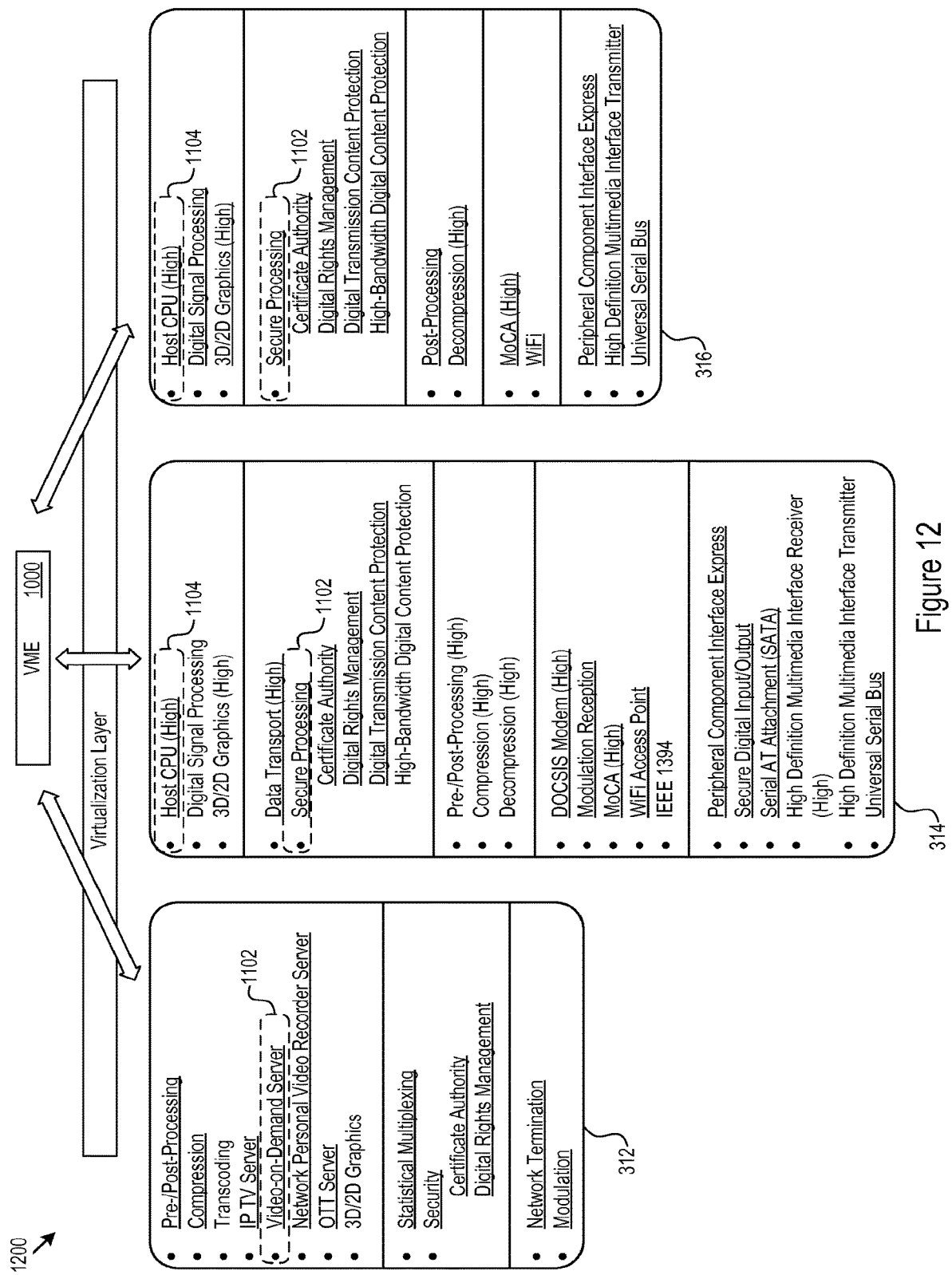
FIG. 12 shows an example initial configuration of functions at the allocations of the network.

FIG. 12 shows an example initial configuration 1200 of functions 1102, 1104 at the allocations 312, 314, 316 of the network. Functions 1102, 1104 marked with an underline may be active at the network allocation in the example initial configuration 1200.

Figure 13:
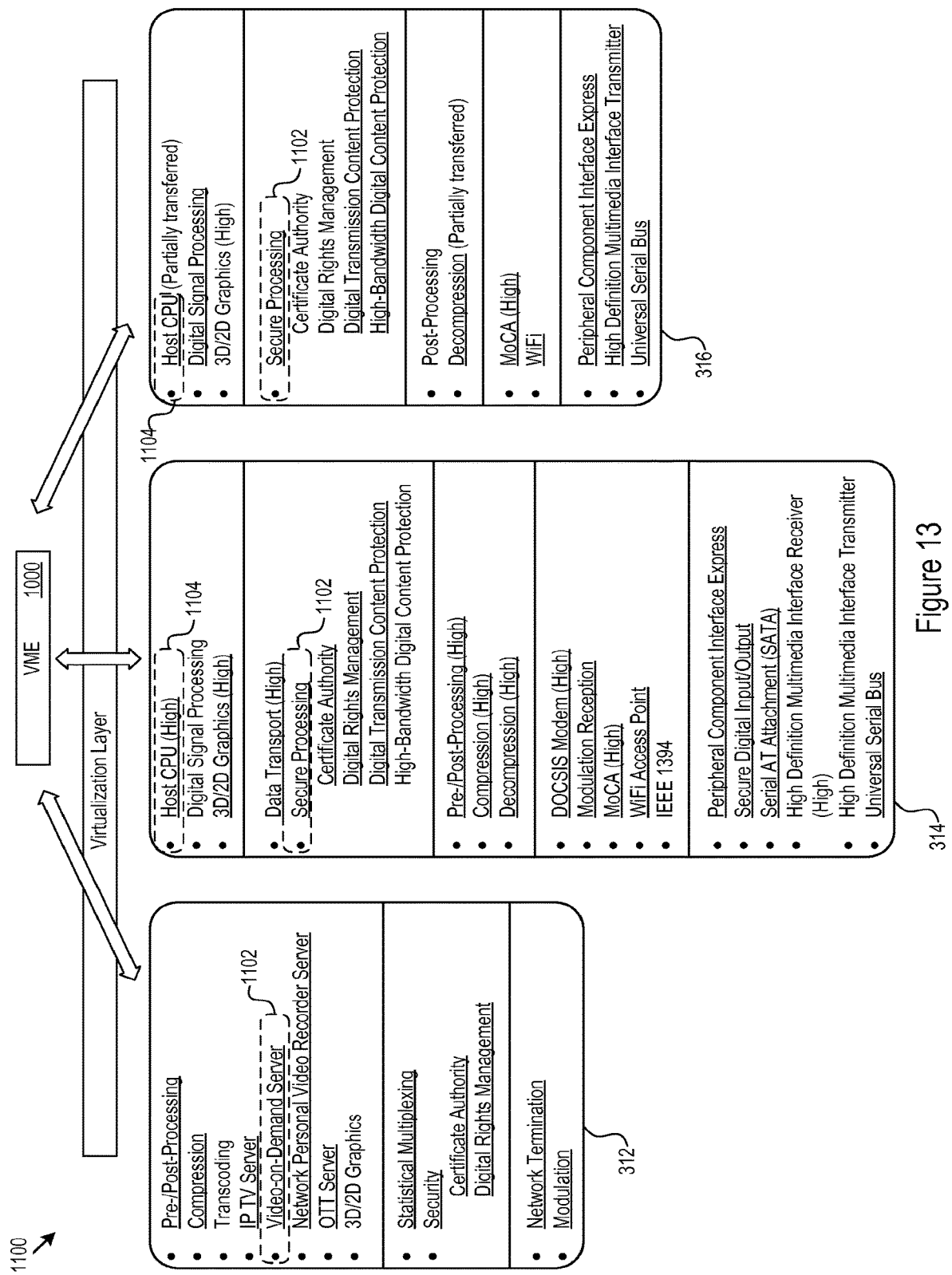
FIG. 13 shows an example adjusted configuration.

FIG. 13 shows an example adjusted configuration 1300. In the adjusted configuration 1300 the VME 1000 has transferred (or partially transferred) functions from allocation 3 316 to allocation 2 314. In some cases, functions 1102, 1104 may be deactivated at allocation 3. Additionally or alternatively, some high drain functions 1104 may be partially transferred to reduce the high drain function's relative power consumption.

Figure 14:
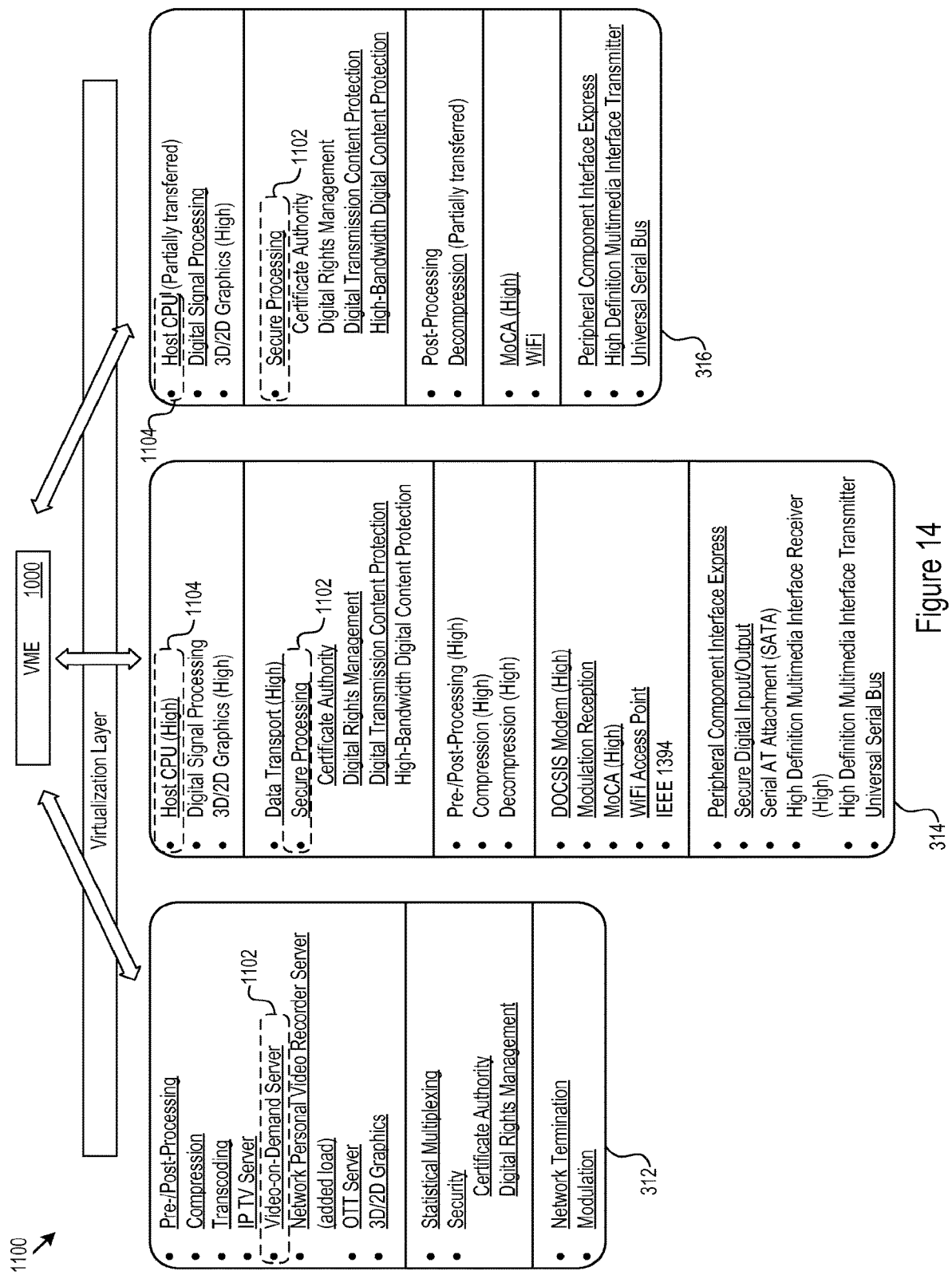
FIG. 14 shows another example adjusted configuration.

FIG. 14 shows another example adjusted configuration 1400. In the adjusted configuration 1400 the VME 1000 has transferred (or partially transferred) functions from allocation 2 316 to allocation 1 314 and after previous transferring functions from allocation 3 316 to allocation 2 314. Through these transfers, the VME 1000 has reduced the functions contributing to power consumption at allocation 2 and allocation 3.

Figure 15:
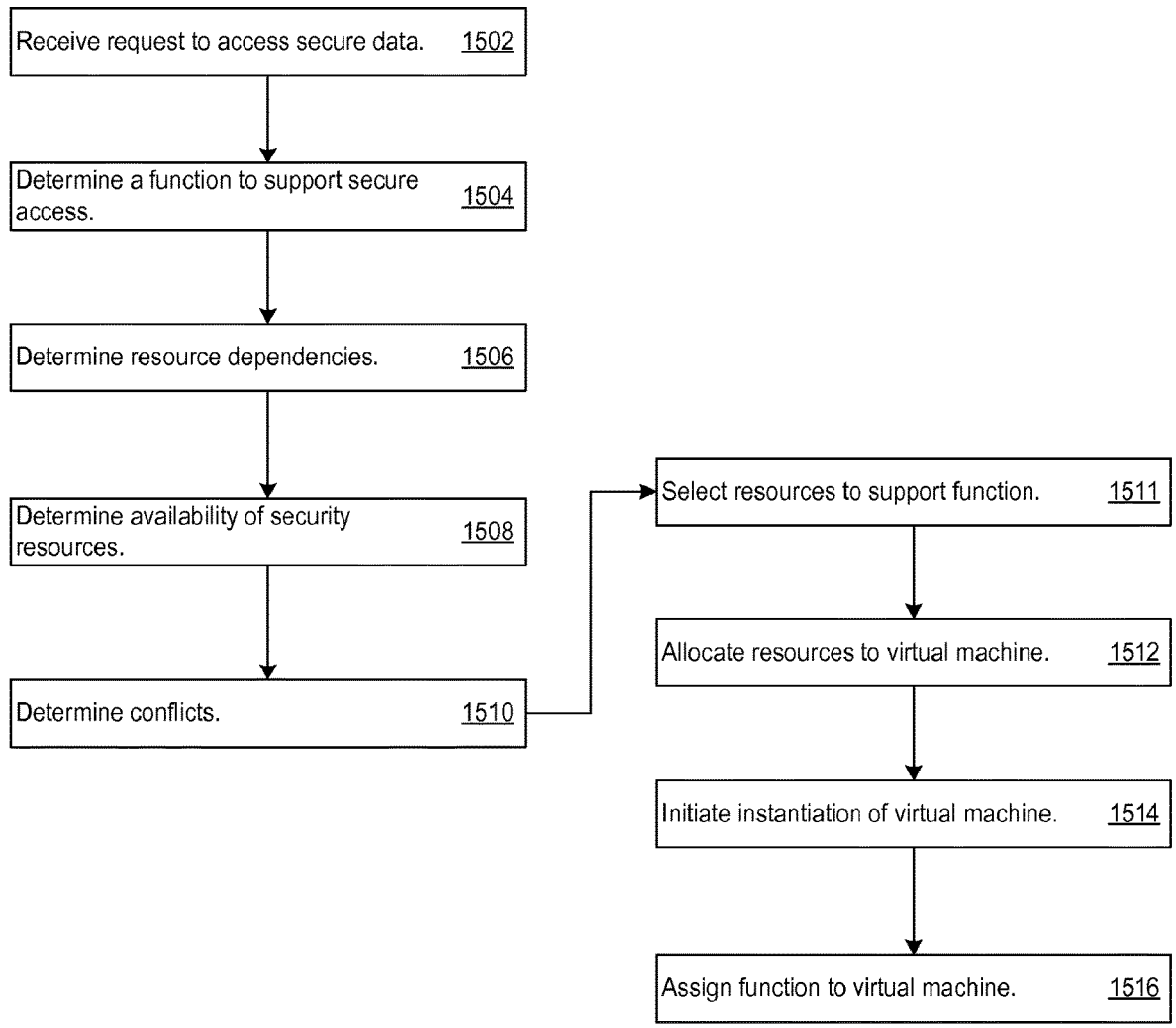
FIG. 15 shows example VME for security function reallocation.

Turning now to FIG. 15, example VME 1500 for security function reallocation is shown. The example VME 1500 may receive a request to access secure data from a node (1502). The VME 1500 may determine a function to support access to the secure content (1504). The VME 1500 may determine security resource dependencies to support the function (1506). The VME 1500 may determine availability of security resources at the allocations of the network (1508). For example, the VME 1500 may determine if a given component of an allocation of the network is capable of providing a given resource dependency. The VME 1500 may determine whether the given security resource dependency conflicts with applications running at the allocations (1510). For example, a resource dependency, such as secure ports, may interfere with flash drive usage or other port usage. Hence, to provide operator flexibility functions with secure port dependencies may be transferred to a allocation of the network where secure ports are unneeded for the function or do not necessarily interfere with other applications. Responsive the resource availability and conflict analysis, the VME 1500 may select resources to support the function (1511). The VME 1500 allocate the resources to a VM (1512). The VME 1500 may initiate the instantiation of the VM (1514). The VME 1500 may assign the function to the VM (1516).

In some cases, certain security functions, e.g., secure key storage and protection, depend on platform security from a basic hardware level. For example, for secure key storage, compromised hardware integrity may allow dissemination of secure keys, which may undermine secure processes such as, digital rights management, content protection, encryption, or other secure processes. Hence, in some cases, service providers may not necessarily place such keys on consumer administered equipment. Virtualizing security functions may allow sensitive information to be held closer to the network core, e.g., at allocation 312 and at allocation 2 314.

Figure 16:
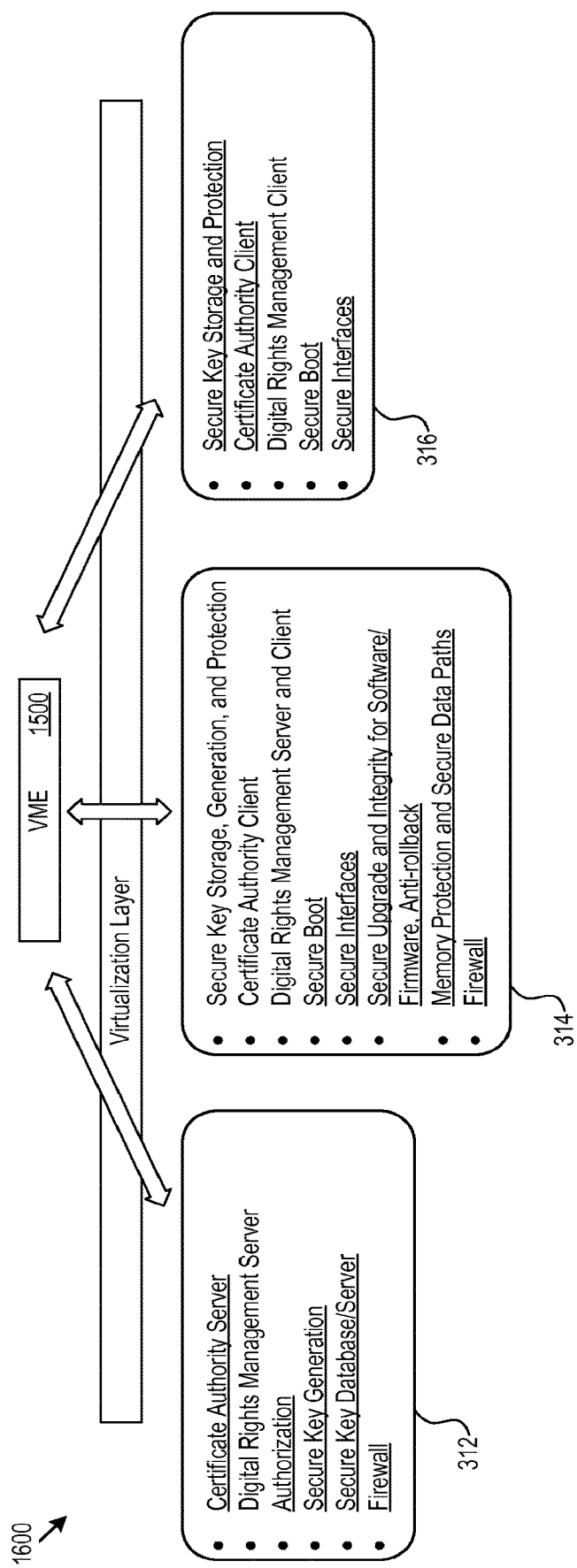
FIG. 16 shows an example security configuration.

FIG. 16 shows an example security configuration 1600. Security features marked by underlining may be active at a given allocation 312, 314, 316. In the example security configuration 1600, keys and certificates may be stored at allocation 3 316 nodes. In some cases, secure interfaces and secure boot protocols may be enforced at the allocation 3 316 nodes to protect the keys and certificates. However, operators may have greater flexibility if nodes may be used even if such enforcement is not active. For example, non-enforcement of certain security functions may facilitate the use of some consumer devices that may not necessarily support such security functions, e.g., secure boot and secure interfaces.

Figure 17:
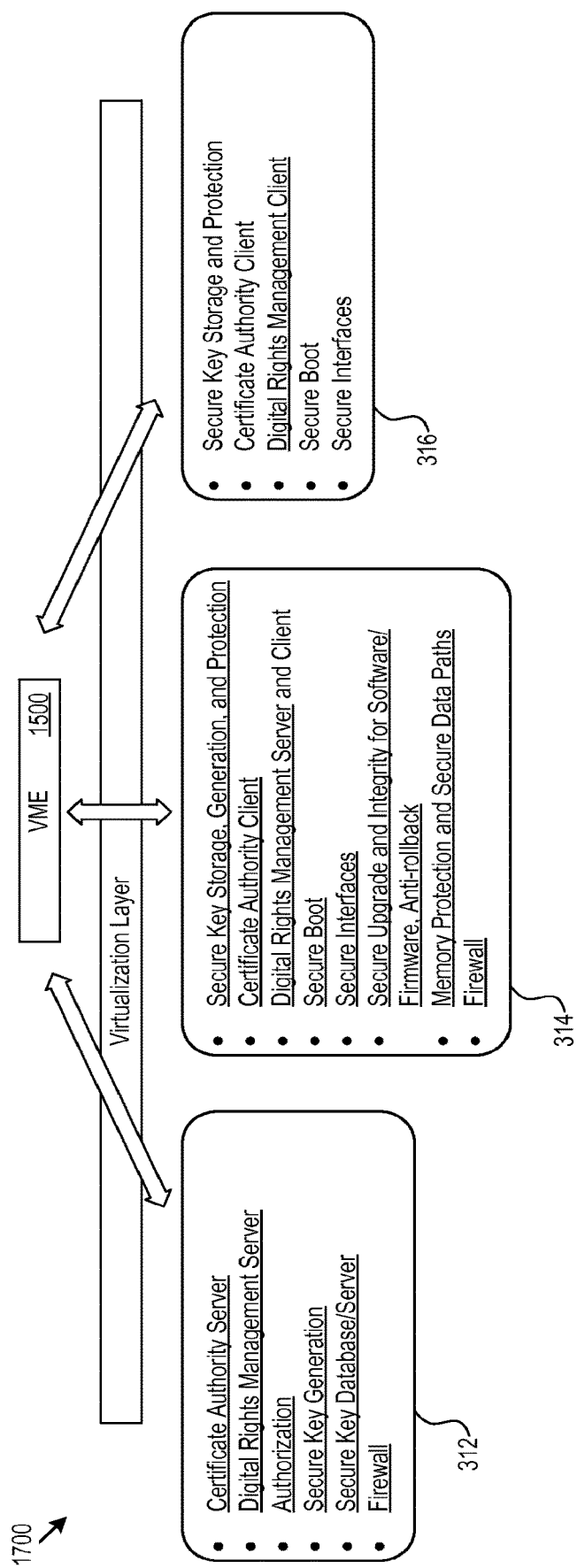
FIG. 17 shows an example adjusted security configuration.

FIG. 17 shows an example adjusted security configuration 1700. In the example adjusted security configuration 1700, security functions active in the configuration 1600 at allocation 316 are moved to allocation 312 and allocation 314. This may allow the system to adapt to clients that may not necessarily support some security features that were enforced for the example configuration 1600. For example, over-the-top (OTT) retail nodes may not necessarily support some security features that were enforced for the example configuration 1600.

In some cases, factors other than (or in addition to) power or security may be used to determine the distribution of functions at the various allocations. For example, processing complexity may be used as a basis for distribution of functions. In an example scenario, a PDS may have relatively high processing resource availability. In some cases, gateways and nodes may have less processing resource availability. Thus, the system may distribute heavy processing tasks closer to the core of the network to utilize the greater availability of processing resources. In an example case, voice recognition processing may be passed from the allocation 3 316 node to a PDS at allocation 1 312.

Figure 18:
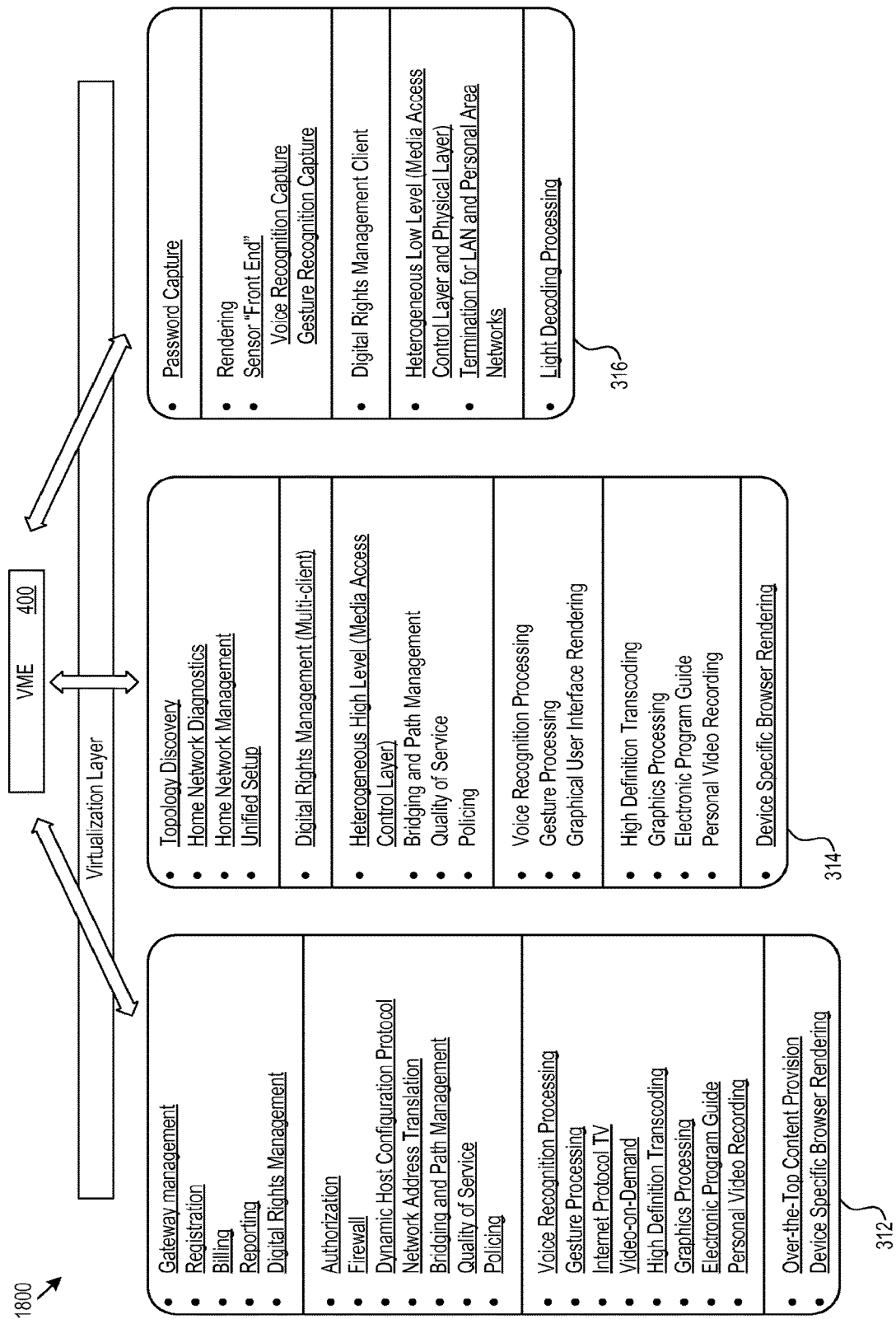
FIG. 18 shows an example configuration of functions.

FIG. 18 shows an example configuration of functions 1800. The functions marked by underlining may be active at a given allocation. In the example configuration 1800, functions that are relatively complex may be distributed toward allocation 312. However, functions that are relatively simple may be maintained at the network edge to reduce operator experienced latency. In some cases, initial processing for a task may be done near the network edge (e.g., at allocation 2 314 or allocation 3 316). An initial processing result may be used to provide a low latency response. However, final processing may be completed nearer to the core of the network (e.g., at allocation 1 312 or allocation 2 314). A higher latency correction may be later applied to correct the initial low latency result.

In the examples shown in FIGS. 11 to 14 and FIGS. 16 to 18, VF reallocation decisions may be determined in response to the network topology of the node used in the service. For example, the user group topology in terms of network nodes location may be used to determine function reallocation for transcoding, personal video recording, graphics processing, and other tasks. Topology based reallocation determinations may affect network resource utilization. Thus, topology based allocation decisions may be used to distribute tasks in accord with efficient resource utilization at the various allocations (e.g., allocations 312, 314, 316) of the network.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A device comprising:
   a memory; and
   at least one processor configured to:
      determine that a provider data system is providing a first stream to a first client via a gateway and a second stream to a second client via the gateway, the first stream comprising a transcoded version of the second stream;

determine that the gateway has a transcoding capability;

responsive to the transcoding capability; and instruct the gateway to transcode the second stream at the gateway to generate a replacement stream for the first stream for transmission to the first client, wherein the provider data system, the gateway, the first client, and the second client are each separate devices; and wherein a transcoding capability of the gateway is assigned to a virtual function provisioned to send the transcoded version of the second stream to the first client; and wherein network resources for provisioning the second stream is assigned from the provider data system to the gateway to the virtual function.

2. The device of claim 1, wherein the at least one processor is further configured to:

instruct the provider data system to send a metadata stream to the gateway to assist in transcoding the second stream.

3. The device of claim 2, wherein:

the second stream comprises video encoded according to a first encoding scheme; and the metadata stream comprises coarse motion vectors for a second encoding scheme different from the first.

4. The device of claim 1, wherein the at least one processor is further configured to:

assign the transcoding capability to the virtual function by instantiating the virtual function, at least in part, on a virtual machine setup on the gateway.

5. The device of claim 1, wherein the at least one processor is further configured to:

monitor a performance parameter of a network that couples the gateway to the provider data system; and instruct the provider data system to cease providing the first stream and to provide the second stream to the gateway responsive to the transcoding capability and a change in the performance parameter, wherein the performance parameter comprises a communication channel bandwidth.

6. A computer program product comprising code stored in a non-transitory computer-readable storage medium, the code comprising:

code to determine that a provider data system is providing a first stream to a first client via a gateway and a second stream to a second client via the gateway, the first stream comprising a transcoded version of the second stream;

code to determine that the gateway has a transcoding capability;

code to, responsive to the transcoding capability, instruct the gateway to transcode the second stream at the gateway to generate a replacement stream for the first stream for the first client;

code to assign a transcoding capability of the gateway to a virtual function provisioned to send the transcoded version of the second stream to the first client and to assign network resources for provisioning the second stream from the provider data system to the gateway to the virtual function.

7. The computer program product of claim 6, wherein the code further comprises:

code to instruct the provider data system to send a metadata stream to the gateway to assist in transcoding the second stream.

8. The computer program product of claim 7, wherein:

the second stream comprises video encoded according to a first encoding scheme; and the metadata stream comprises coarse motion vectors for a second encoding scheme different from the first.

9. The computer program product of claim 6, wherein the code further comprises:

code to assign the transcoding capability to the virtual function by instantiating the virtual function, at least in part, on a virtual machine setup on the gateway.

10. The computer program product of claim 6, wherein the code further comprises:

code to monitor a performance parameter of a network that couples the gateway to the provider data system; and code to instruct the provider data system to cease providing the first stream and to provide the second stream to the gateway responsive to the transcoding capability and a change in the performance parameter.

11. The computer program product of claim 10, wherein the performance parameter comprises a communication channel bandwidth.

12. A method comprising:

determining that a provider data system is providing a first stream to a first client via a gateway and a second stream to a second client via the gateway, the first stream comprising a transcoded version of the second stream;

determining that the gateway has a transcoding capability;

responsive to the transcoding capability; and instructing the gateway to transcode the second stream at the gateway to generate a replacement stream for the first stream for transmission to the first client;

assigning a transcoding capability of the gateway to a virtual function provisioned to send the transcoded version of the second stream to the first client; and assigning network resources for provisioning the second stream from the provider data system to the gateway to the virtual function.

13. The method of claim 12, further comprising:

instructing the provider data system to send a metadata stream to the gateway to assist in transcoding the second stream.

14. The method of claim 13, wherein:

the second stream comprises video encoded according to a first encoding scheme; and the metadata stream comprises coarse motion vectors for a second encoding scheme different from the first.

15. The method of claim 12, further comprising:

assigning the transcoding capability to the virtual function by instantiating the virtual function, at least in part, on a virtual machine setup on the gateway.

16. The method of claim 12, further comprising:

monitoring a performance parameter of a network that couples the gateway to the provider data system; and instructing the provider data system to cease providing the first stream and to provide the second stream to the gateway responsive to the transcoding capability and a change in the performance parameter, wherein the performance parameter comprises a communication channel bandwidth.

17. The method of claim 12, wherein the first stream and the second stream comprise a same content.

* * * * *